United States Patent
Moon et al.

(10) Patent No.: US 7,532,591 B2
(45) Date of Patent: May 12, 2009

(54) RADIO COMMUNICATION SYSTEM, RADIO CONTROLLER AND MOBILE STATION

(75) Inventors: Sung Uk Moon, Yokosuka (JP); Takehiro Nakamura, Yokosuka (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 670 days.

(21) Appl. No.: 11/044,588

(22) Filed: Jan. 28, 2005

(65) Prior Publication Data
US 2005/0190722 A1    Sep. 1, 2005

(30) Foreign Application Priority Data
Jan. 30, 2004    (JP) .............................. 2004-024048

(51) Int. Cl.
H04H 20/71    (2006.01)
H04B 7/212    (2006.01)
H04J 3/06    (2006.01)
H04J 3/26    (2006.01)
H04L 7/00    (2006.01)

(52) U.S. Cl. ...................... 370/312; 370/324; 370/350; 370/432; 370/503; 375/356

(58) Field of Classification Search ................. 370/312, 370/324, 350, 500, 503–519
See application file for complete search history.

(56) References Cited

U.S. PATENT DOCUMENTS

| | | | | |
|---|---|---|---|---|
| 5,361,398 A | * | 11/1994 | Christian et al. ............ | 455/503 |
| 5,537,397 A | * | 7/1996 | Abramson ................... | 370/441 |
| 5,678,193 A | * | 10/1997 | Helm et al. .................. | 455/503 |
| 5,873,044 A | * | 2/1999 | Goldberg et al. ............ | 455/503 |
| 5,883,888 A | * | 3/1999 | St-Pierre .................... | 370/331 |
| 6,011,977 A | * | 1/2000 | Brown et al. ................ | 455/503 |
| 6,266,536 B1 | * | 7/2001 | Janky ......................... | 455/503 |
| 2004/0146030 A1 | * | 7/2004 | Hsieh et al. ................. | 370/336 |
| 2005/0014474 A1 | * | 1/2005 | Jitsukawa et al. ........... | 455/101 |

FOREIGN PATENT DOCUMENTS

| | | |
|---|---|---|
| CN | 1362818 A | 8/2002 |
| EP | 1 220 561 A2 | 7/2002 |
| JP | 10-117165 | 5/1998 |
| JP | 2003-169012 | 6/2003 |
| JP | 2003-283410 | 10/2003 |
| WO | WO 03049322 A1 * | 2/2003 |

* cited by examiner

Primary Examiner—Daniel J Ryman
Assistant Examiner—Christopher Crutchfield
(74) Attorney, Agent, or Firm—Oblon, Spivak, McClelland, Maier & Neustadt, P.C.

(57) ABSTRACT

A mobile communication system having a radio controller for transmitting the same information to a mobile station via a plurality of radio links is disclosed. In the system, the mobile station includes an selecting unit for selecting at least one of receiving capability or receiving quality, and a transmitting unit for transmitting the selected information. The radio controller includes a receiving unit for receiving from the mobile station at least one of the receiving capability or reception quality, and a transmission timing controller for controlling transmission timing based on the received information from the mobile station.

2 Claims, 4 Drawing Sheets

RADIO COMMUNICATION SYSTEM, RADIO CONTROLLER AND MOBILE STATION

BACKGROUND OF THE INVENTION

The present invention generally relates to radio communication systems, and more particularly, to a radio communication system, a radio controller and a mobile station in which at least one base station transmits a plurality of the same information to the mobile station via a plurality of radio links.

In this technical field, a radio controller and a base station have UL/DL Node Synchronization functions.

The UL/DL Node Synchronization is performed in order to measure more accurately the transmission delay between the base station and the radio controller when starting and resuming the base station. An explanation of this UL/DL Node Synchronization is given below with reference to FIG. 1.

First, the radio controller transmits a DL Node Synchronization signal to the base station. The DL Node Synchronization signal includes transmission timing information T1 that means the radio controller transmitting time. The Synchronization signal arrives after a transmission delay T2−T1. The T2 means the base station receiving time.

The base station receives the DL Node Synchronization signal and transmits a UL Node Synchronization signal to the radio controller. The UL Node Synchronization signal includes timing information T2 and T3. The T3 means T2+the base station processing delay, and therefore means the base station transmitting time.

The radio controller receives the UL Node Synchronization signal and estimates the timing relation with the base station, based the timing information T1, T2, T3 and T4. The T4 means the radio controller receiving time. The above procedure is repeated at a certain interval, and the timing relation is estimated.

For example, it is defined that Tf is 40960 ms, Tr=Tf−T1, Tb=Tf−T2, and $T\_r1=(T1+Tr) \bmod Tf;$
$T\_r4=(T4+Tr) \bmod Tf;$
$T\_b2=(T2+Tb) \bmod Tf;$ and
$T\_b3=(T3+Tb) \bmod Tf.$ Under this situation, a transmission delay T is represented by $$T=\{(T\_r4-T\_r1)-(T\_b3-T\_b2)\}/2$$

If X1:T2−T1−T, then phase differences (X) between nodes are represented by the following:

$X=X1+Tf$ when $X1<-Tf/2$ $X=X1$ when $-Tf/2<=X1<Tf/2$ $X=X1-Tf$ when $X1>=Tf/2$ The function of the above explained UL/DL Node Synchronization is not publicly known as of the filing date of this patent application.

The applicant of this patent application has not found any prior art publication relating to the present invention. Therefore, no prior document is disclosed.

However, there is a problem as follows.

In the multicast system, a neighboring cell also transmits the same information. Therefore, mobile stations can receive plural same signals from plural cells via plural radio links, and perform a maximum ratio combining process or a selective combining process. In order to perform such maximum ratio combining process or selective combine process, it is necessary for the mobile station to have the capability of processing plural radio links, including memory, encoding/decoding capability, and so on.

Timing synchronization between cells should not exceed mobile station processing capability. The timing of each cell may vary due to difference in reference clocks.

SUMMARY OF THE INVENTION

A general object of the present invention is to provide a radio communication system, a radio controller and a mobile station, in which mobile station receiving quality and effectiveness of radio resource employment can be improved.

The above object of the present invention is achieved by a radio controller in a mobile communication system for transmitting same information to a mobile station via a plurality of radio links, comprising: a receiving unit for receiving from the mobile station at least one of receiving capability and reception quality; and a transmission timing controller for controlling transmission timing based on the receiving capability or reception quality from mobile station.

In the radio controller, the transmission timing controller, based on the receiving capability or reception quality from mobile station, may change at least one of a period for transmission timing synchronization for the radio links and accuracy of the synchronization.

In the radio controller, the transmission timing controller, based on the receiving capability, may determine transmission timing for the same information.

Another object of the present invention is to provide a mobile station in a mobile communication system for transmitting same information via a plurality of radio links, comprising: an selecting unit for selecting at least one of receiving capability and reception quality; and a transmitting unit for transmitting the selected information.

A further object of the present invention is to provide a mobile communication system having a radio controller for transmitting same information to a mobile station via a plurality of radio links, wherein:

the mobile station comprises an selecting unit for selecting at least one of receiving capability and reception quality; and a transmitting unit for transmitting the selected information; and the radio controller comprises a receiving unit for receiving from the mobile station at least one of the receiving capability and reception quality; and a transmission timing controller for controlling transmission timing, based on the received information from the mobile station.

DESCRIPTION OF THE PREFERRED EMBODIMENTS

Figure 1:
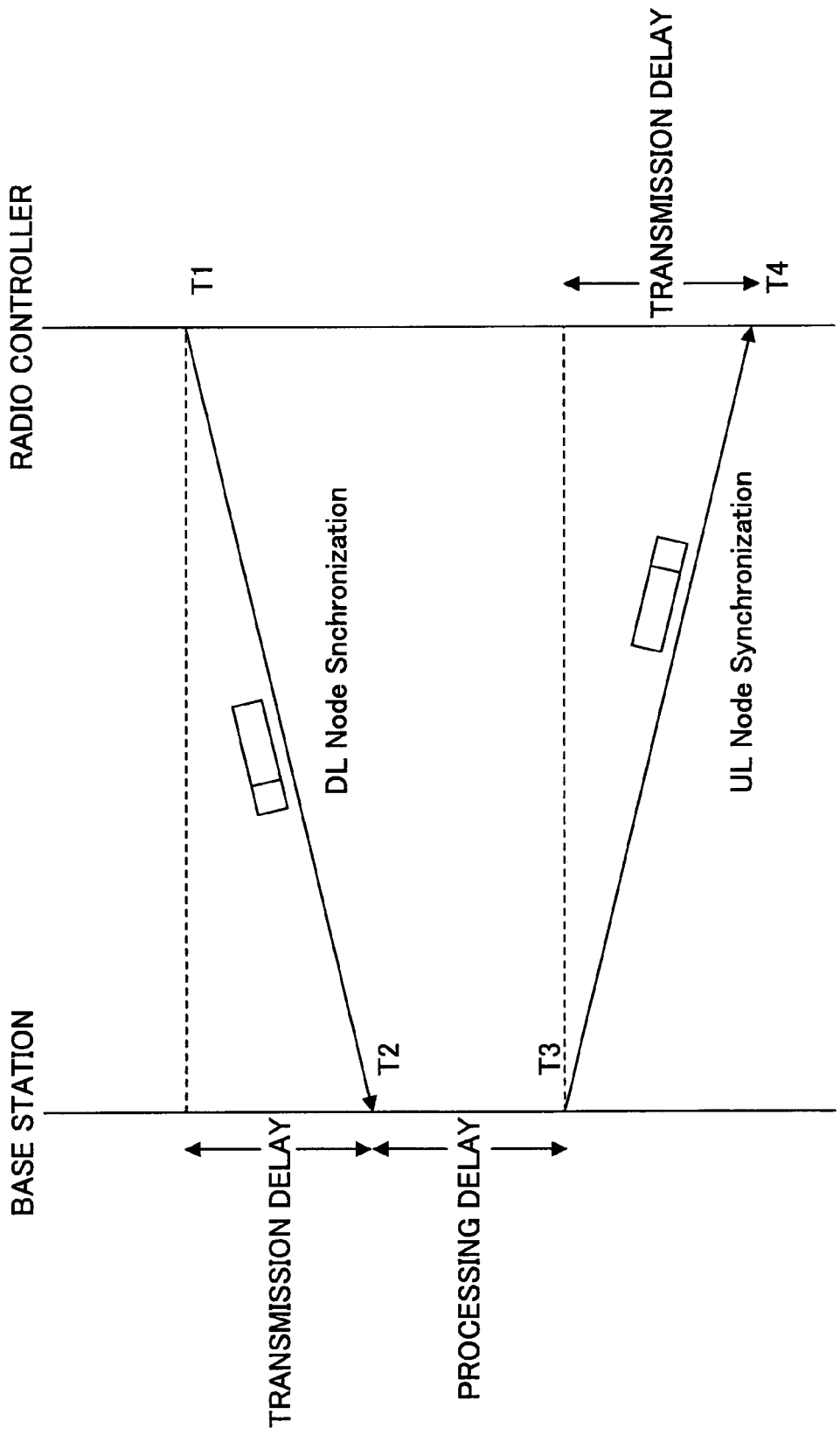
FIG. 1 is a sequence chart for illustrating UL/DL Synchronization in a mobile communication system.

The following is a description of embodiments of the present invention, with reference to the accompanying drawings.

Throughout the drawings, members having the same function are assigned the same reference numerals and redundant explanation is omitted.

Figure 2:
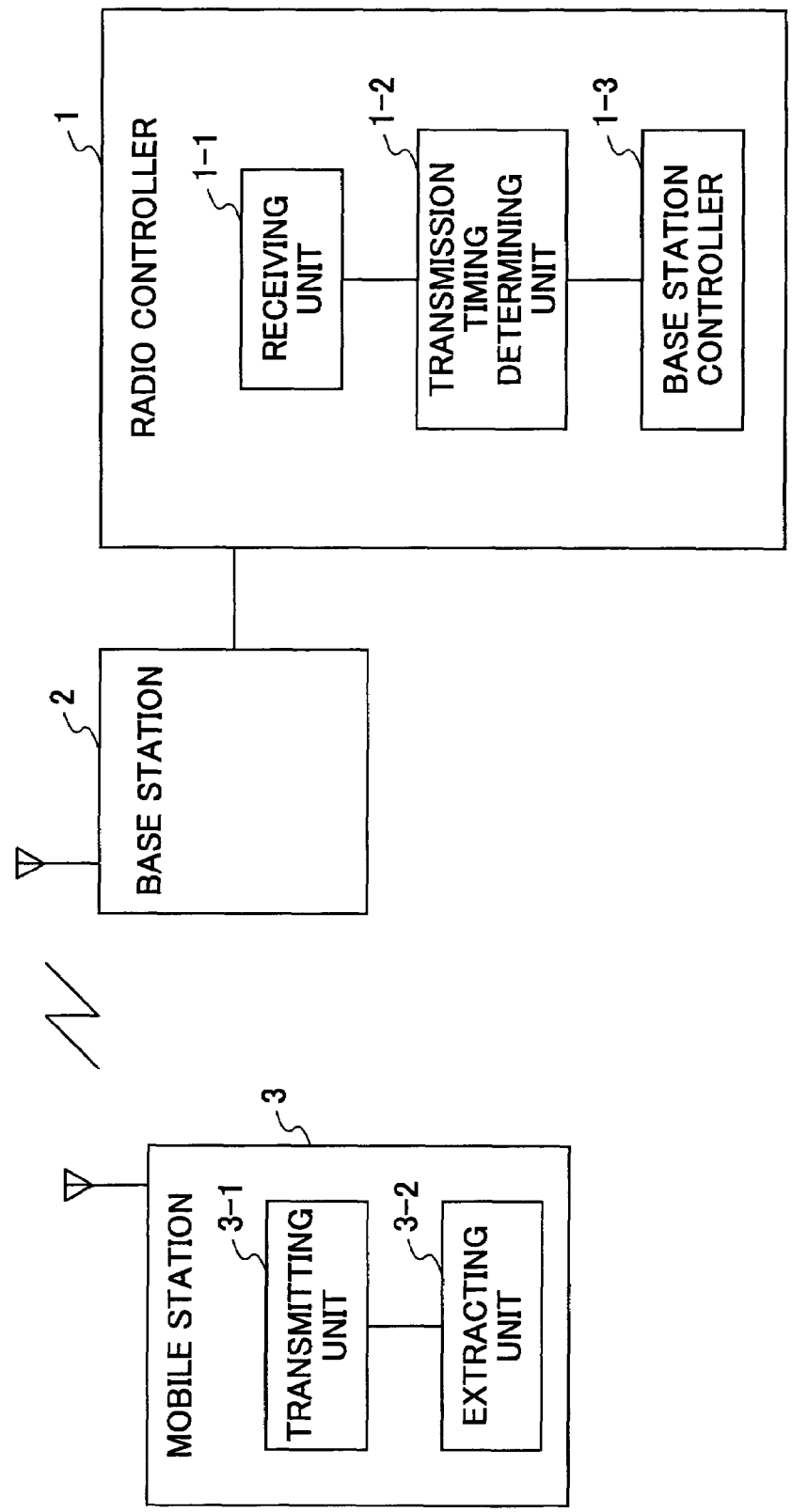
FIG. 2 is a block diagram of a mobile communication system according to a first embodiment of the present invention.

A mobile communication system according to a first embodiment of the present invention is explained below with reference to FIG. 2.

The mobile communication system 10 according to this embodiment comprises a radio controller 1, a base station 2 connected to the radio controller 1 via, for example, a digital transmission path, and a mobile station 3 connected to the base station 2. FIG. 2 shows only one mobile station, but the actual system has plural mobile stations that are scatteringly located. Each of the mobile stations establishes a radio link to the base station, and therefore a multicast system is formed.

The radio controller 1 includes a receiving unit 1-1, a transmission timing determining unit 1-2 connected to the receiving unit 1-1, and a base station controller 1-3 connected to the transmission timing determining unit 1-3. The receiving unit 1-1 receives at least either one of receiving capability or reception quality, which is sent from the mobile station 3 and indicates information of the mobile station 3. The receiving unit 1-1 inputs the received information of the mobile station to the transmission timing determining unit 1-2. Based on the information of the mobile station input from the receiving unit 1-1, the transmission timing determining unit 1-2 determines a transmission timing period for synchronization of the radio link, accuracy of synchronization, information transmission manner, and transmission timing for the same information, etc. The transmission timing determining unit 1-2 inputs the determined result to the base station controller 1-3. Based on the determined result input from the transmission timing determining unit 1-2, the base station controller 1-3 controls the base station 2.

The mobile station 3 comprises an selecting unit 3-2 for selecting receiving capability and reception quality of mobile station, and a transmitting unit 3-1 for transmitting the information selected by the selecting unit 3-2 to the radio controller 1.

Figure 3:
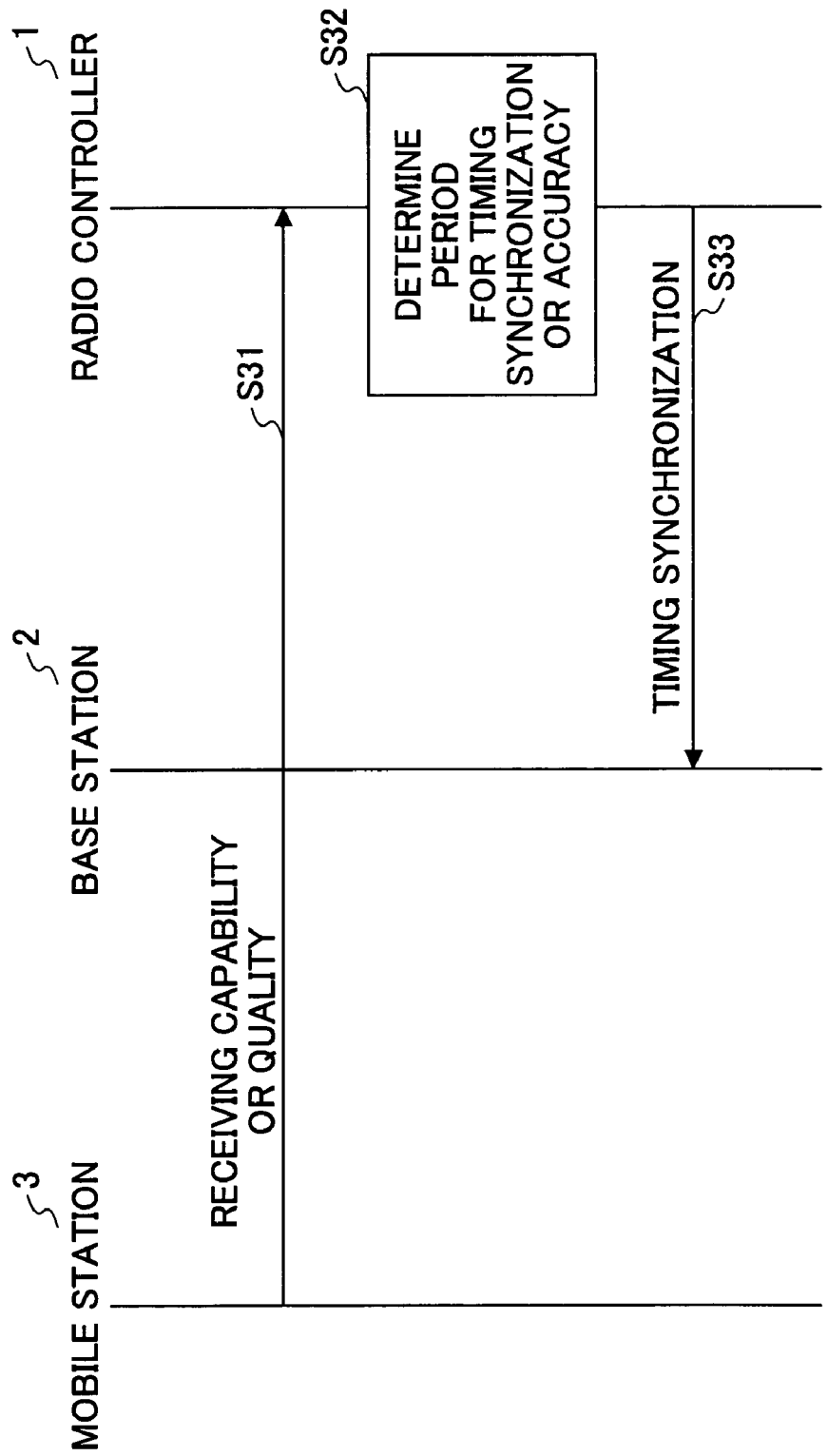
FIG. 3 is a sequence chart illustrating a procedure sequence in the mobile communication system, according to a second embodiment of the present invention.

Next, with reference to FIG. 3, processing sequences in the mobile communication system according to the second embodiment of the present invention are explained below.

The selecting unit 3-2 of the mobile station 3 selects at least one piece of information of the mobile station, among memory capacity, received power, receiving capability such as encoding/decoding capabilities, CRC (Cyclic Redundancy Check) results, and receiving quality such as signal-to-interference ratio. The selected information of the mobile station is transmitted by the transmitting unit 3-1 to the radio controller 1 (Step S31).

The receiving unit 1-1 of the radio controller 1 receives the mobile station information. The received information is input to the transmission timing determining unit 1-2. The transmission timing determining unit 1-2 makes the following determination, based on the mobile station information input from the receiving unit 1-1 (Step S32).

If the input receiving capability or reception quality is lower than a predetermined threshold, a period for timing synchronization is shortened or synchronization accuracy is made higher. When the period for timing synchronization is to be shortened, it is decided that, for example, once per ten minutes is changed to once per one minute. When the synchronization accuracy is to be made higher, it is decided that, for example, the maximum synchronization error is changed from one frame to one slot. It can be decided that the period for the timing synchronization is to be shortened and the synchronization accuracy is to be made higher.

In this manner, the radio controller 1 can monitor the mobile station capabilities. The base station 2 controlled by the radio controller 1 can send information to the mobile station 3 so that the mobile station 3 improves its receiving quality.

On the other hand, if the receiving capability or reception quality is higher than the predetermined threshold, that is, it is determined that precise timing synchronization is not necessary, the period for timing synchronization or the timing accuracy is set lower. In this manner, wasting radio resources can be avoided, and radio resources can be effectively utilized. In this situation, the timing synchronization can be performed with a shortened period for synchronization and lowered synchronization accuracy.

Next, the timing determining unit 1-2 supplies the determined timing synchronization signal to the base station controller 1-3. The base station controller 1-3 controls the base station, based on the input timing synchronization (Step S33).

Figure 4:
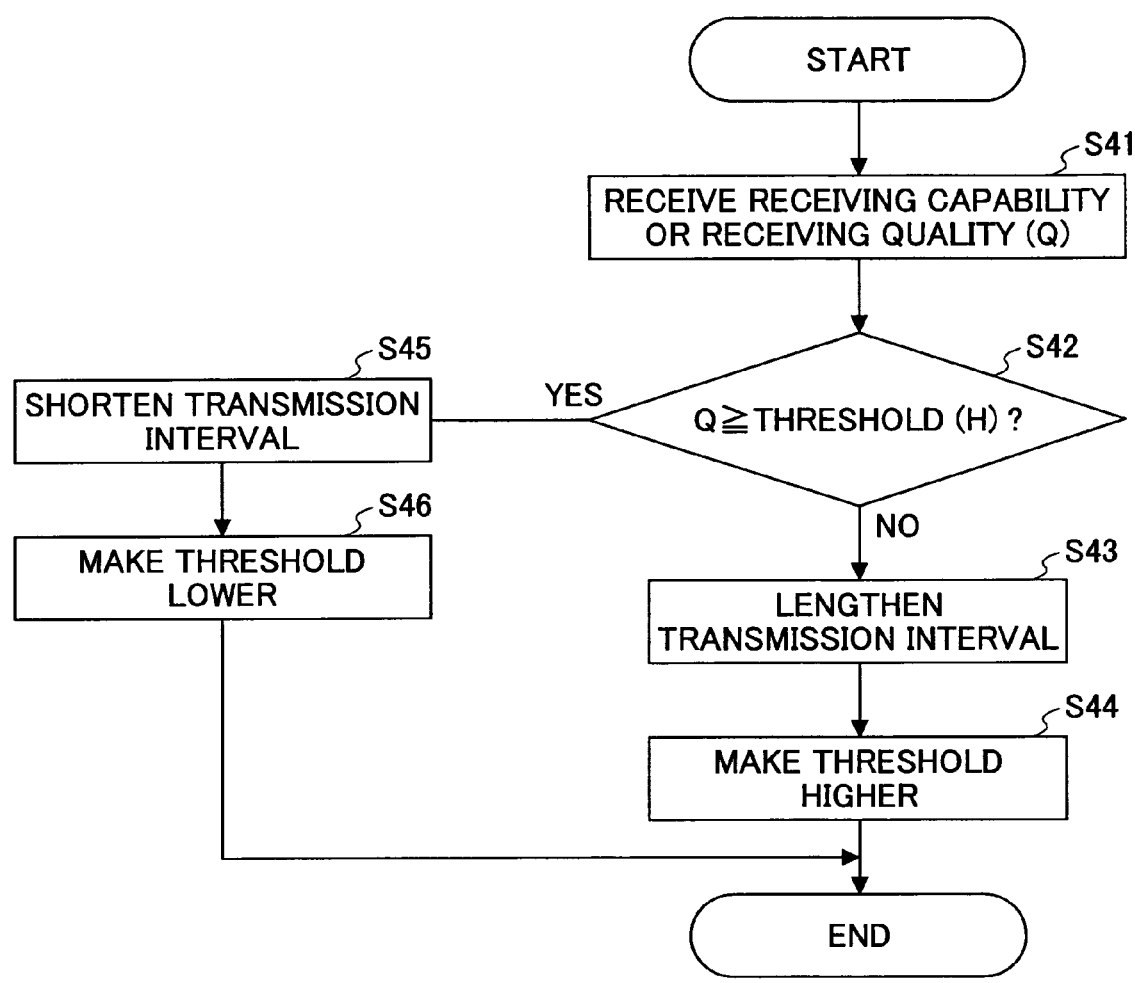
FIG. 4 is a flow chart illustrating procedures in the mobile communication system, according to a third embodiment of the present invention.

Procedures in the mobile communication system according to the third embodiment of the present invention are explained below, with reference to FIG. 4.

The receiving unit 1-1 of the radio controller 1 receives at least one piece of the mobile station information from the mobile station 3 (Step S41). The mobile station information includes memory capacity, reception power, receiving capability such as encoding/decoding capabilities, CRC (Cyclic Redundancy Check) results, and reception quality (referred to as "Q" herein later) such as signal-to-interference ratio.

The received mobile station information Q is input from the receiving unit 1-1 to the transmission timing determining unit 1-2. The transmission timing determining unit 1-2 determines whether the input mobile station information is lower than a predetermined threshold (Step S42).

If the input mobile station information Q is lower than a predetermined threshold (Q<Threshold) (Step S42, NO), an interval for transmitting the same information is made longer, for example, once per three frames (Step S43), and the threshold is made higher (Step S44). In this manner, the radio controller 1 can monitor the mobile station capabilities. The base station 2 controlled by the radio controller 1 can send information to the mobile station 3 so that the mobile station 3 can perform maximum ratio combining or selection combining and improve its reception quality.

On the other hand, if the input mobile station information Q is greater than or equal to the predetermined threshold (Q>=Threshold) (Step S42, YES), the transmission interval is shortened (Step S45), and the threshold is lowered (Step S46). In this manner, wasting radio resources can be avoided, and radio resources can be effectively utilized.

In this embodiment, when the input receiving capability or reception quality (Q) is higher than the predetermined threshold, the transmission interval is shortened. However, instead of shortening the transmission interval, continuous transmission can be adapted.

In the above embodiments, the transmission determining unit 1-2 is provided within the radio controller 1. However, the transmission determining unit 1-2 can be provided within the base station 2. In this case, the mobile station 3 sends at least one of receiving capability or reception quality indicating mobile station information to the base station 2. The base station 2, based on the received information from mobile station, controls the period for transmission timing of the radio link, synchronization accuracy, information transmission method, timing for transmitting the same information, and so on.

According to the embodiments of the present invention, a mobile communication system, a radio controller and a mobile station can be provided in which mobile station receiving quality can be improved and radio resources can be effectively used.

Mobile communication systems according to the present invention can be applied to multicast systems for transmitting the same information to a mobile station via multiple radio links.

The present application is based on Japanese Priority Application No. 2004-024048 filed on Jan. 30, 2004 with the Japanese Patent Office, the entire contents of which are hereby incorporated by reference.

What is claimed is:

1. A radio controller in a mobile communication system for transmitting same information to a mobile station via a plurality of radio links, comprising:
   a receiving unit configured to receive from the mobile station via a base station at least one of receiving capability and reception quality; and
   a transmission timing controller configured to shorten a transmission interval of a timing synchronization signal transmitted by the radio controller to the base station if the receiving capability or reception quality is lower than a predetermined threshold.

2. A mobile communication system having a radio controller for transmitting same information to a mobile station via a plurality of radio links, comprising:
   the mobile station including
   a selecting unit configured to select at least one of receiving capability and reception quality; and
   a transmitting unit configured to transmit the selected information; and the radio controller including
   a receiving unit configured to receive from the mobile station via a base station at least one of the receiving capability and reception quality; and
   a transmission timing controller configured to shorten a transmission interval of a timing synchronization signal transmitted by the radio controller to the base station if the receiving capability or reception quality is lower than a predetermined threshold.

* * * * *